United States Patent
Jung et al.

(10) Patent No.: US 8,471,400 B2
(45) Date of Patent: Jun. 25, 2013

(54) VEHICLE GENERATOR CONTROL SYSTEM AND METHOD FOR SAVING FUEL

(75) Inventors: Minyoung Jung, Hwaseong-si (KR); Jiyong Yu, Pocheon-si (KR); Junyong Lee, Hwaseong-si (KR); Daekwang Kim, Hwaseong-si (KR); Chikung Ahn, Hwaseong-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 84 days.

(21) Appl. No.: 13/300,356

(22) Filed: Nov. 18, 2011

(65) Prior Publication Data
US 2013/0057226 A1    Mar. 7, 2013

(30) Foreign Application Priority Data
Sep. 1, 2011    (KR) .......................... 10-2011-0088463

(51) Int. Cl.
   *H02P 9/04*    (2006.01)
(52) U.S. Cl.
   USPC .............................................. 290/55; 318/443
(58) Field of Classification Search
   USPC ...................................... 290/54–55; 318/443
   See application file for complete search history.

(56) References Cited

U.S. PATENT DOCUMENTS

| | | | |
|---|---|---|---|
| 5,266,836 A | 11/1993 | Sousa | |
| 5,424,714 A * | 6/1995 | Kin et al. | 340/438 |
| 6,067,808 A * | 5/2000 | Dage | 62/150 |
| 6,281,649 B1 * | 8/2001 | Ouellette et al. | 318/443 |
| 2004/0008000 A1 * | 1/2004 | Merkel et al. | 318/444 |
| 2006/0006826 A1 * | 1/2006 | Morishita | 318/483 |

FOREIGN PATENT DOCUMENTS

| | | |
|---|---|---|
| JP | 58012501 (A) | 1/1983 |
| JP | 8168103 (A) | 6/1996 |
| JP | 2003-224935 A | 8/2003 |
| JP | 2004180461 (A) | 6/2004 |
| JP | 2005063682 (A) | 3/2005 |
| JP | 2005-110339 A | 4/2005 |
| JP | 2007-244007 A | 9/2007 |
| JP | 2007223386 (A) | 9/2007 |
| KR | 1019990027631 (A) | 4/1999 |
| KR | 1020030065289 (A) | 8/2003 |
| KR | 1020080016232 (A) | 2/2008 |
| KR | 1020090050247 (A) | 5/2009 |
| KR | 1020100017027 (A) | 2/2010 |
| KR | 1020100063921 (A) | 6/2010 |
| KR | 1020100064067 (A) | 6/2010 |

* cited by examiner

*Primary Examiner* — Truc Nguyen
(74) *Attorney, Agent, or Firm* — Morgan, Lewis & Bockius LLP

(57) ABSTRACT

A vehicle generating system for saving fuel includes a battery supplying power to electric loads in a vehicle, an electric generator supplying power to the battery and the electric loads, a speed calculation module that calculates operation speed of a wiper in the electric loads, and an ECU including an electric generation control prevention module controlling the electric generator to perform electric generation control prevention when the operation speed calculated by the speed calculation module is compared with a predetermined reference speed and the calculated operation speed is equal to or more than the reference speed, and controlling the electric generator to remove the electric generation control prevention when the operation speed is less than the reference speed.

7 Claims, 6 Drawing Sheets

VEHICLE GENERATOR CONTROL SYSTEM AND METHOD FOR SAVING FUEL

CROSS-REFERENCE TO RELATED APPLICATIONS

The present application claims priority of Korean Patent Application Number 10-2011-0088463 filed Sep. 1, 2011, the entire contents of which application is incorporated herein for all purposes by this reference.

BACKGROUND OF INVENTION

1. Field of Invention

The present invention relates to a vehicle generating system and a control method of the same, and more particularly, to a vehicle generating system that controls an electric generator for saving fuel and a control method of the same.

2. Description of Related Art

Recently, vehicle generating systems are provided with various control logics that control voltage of an alternator in order to improve fuel efficiency.

However, the control logics for improving fuel efficiency change the operation speed of the wipers due to a change in generated voltage when the wipers operate. In particular, when the wipers operate at a high speed, the operation speed of the wipers is remarkably reduced by the change in generated power or the operation speed frequently changes.

In order to remove the problem, a logic for determining whether to apply control of electric generation in accordance with the operation of wipers by operating a wiper-on-time by operation of the wipers has been developed for vehicle generating system in the related art.

In detail, the control logic of the related art operates the wiper-on-timer when a wiper operation signal LV_WIPER shown in FIG. 1 is 1. Further, the control logic makes an electric generation control prevention signal LV_INH_BEM 1 and operates an wiper-off-timer, from when a wiper-on-timer signal (T_WIPER_ON) becomes 0.

The control logic of the related art resets a timer when the wipers operate before the wiper-off-timer signal T_WIPER_OFF becomes 0. Further, the control logic keeps the electric generation control prevention signal LV_INH_BEM 1 until the wiper-off-timer signal becomes 0.

However, since the control logic relating to the wipers is performed in accordance with the operation time of the wipers, without considering the operation speed of the wipers, as shown in FIG. 1, when a wiper-off-timer for preventing electric generation control is set in accordance with "Short Switching Time Period", the electric generation control prevention signal LV_INH_BEM oscillates at "Long Switching Time Period" and the battery voltage correspondingly oscillates, such that the operability is deteriorated in the idle section.

The related Patent is KR 10-2010-0063921 A, Jun. 14, 2010.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a vehicle generating system that can minimize abnormal operation of wipers which may be generated in electric generation for reducing fuel consumption, by implementing an electric generation control logic for reducing the fuel consumption relating to the operation of the wipers in consideration of the operation speed of the wipers.

Various aspects of the present invention provide for a vehicle generating system for saving fuel, including a battery supplying power to electric loads in a vehicle, an electric generator supplying power to the battery and the electric loads, a speed calculation module that calculates operation speed of a wiper in the electric loads, and an ECU including an electric generation control prevention module controlling the electric generator to perform electric generation control prevention when the operation speed calculated by the speed calculation module is compared with a predetermined reference speed and the calculated operation speed is equal to or more than the reference speed, and controlling the electric generator to remove the electric generation control prevention when the operation speed is less than the reference speed.

Various aspects of the present invention provide for a method of controlling a vehicle generating system including an electric generator supplying power to a battery and electric loads in a vehicle and an ECU controlling the electric generator, the method including calculating an operation index corresponding to the operation speed of a wiper by monitoring an operation speed signal of the wiper and averaging two connected cycles, when the engine is started, in the ECU, and proceeding to electric generation control prevention when the value of the operation speed index is equal to or less than a predetermined high-speed operation sensing time value, in the ECU.

According to various aspects of the present invention, it is possible to minimize abnormal operation of the wiper which may occur in electric generation control by implementing an electric generation control logic in accordance with the wiper operation speed.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
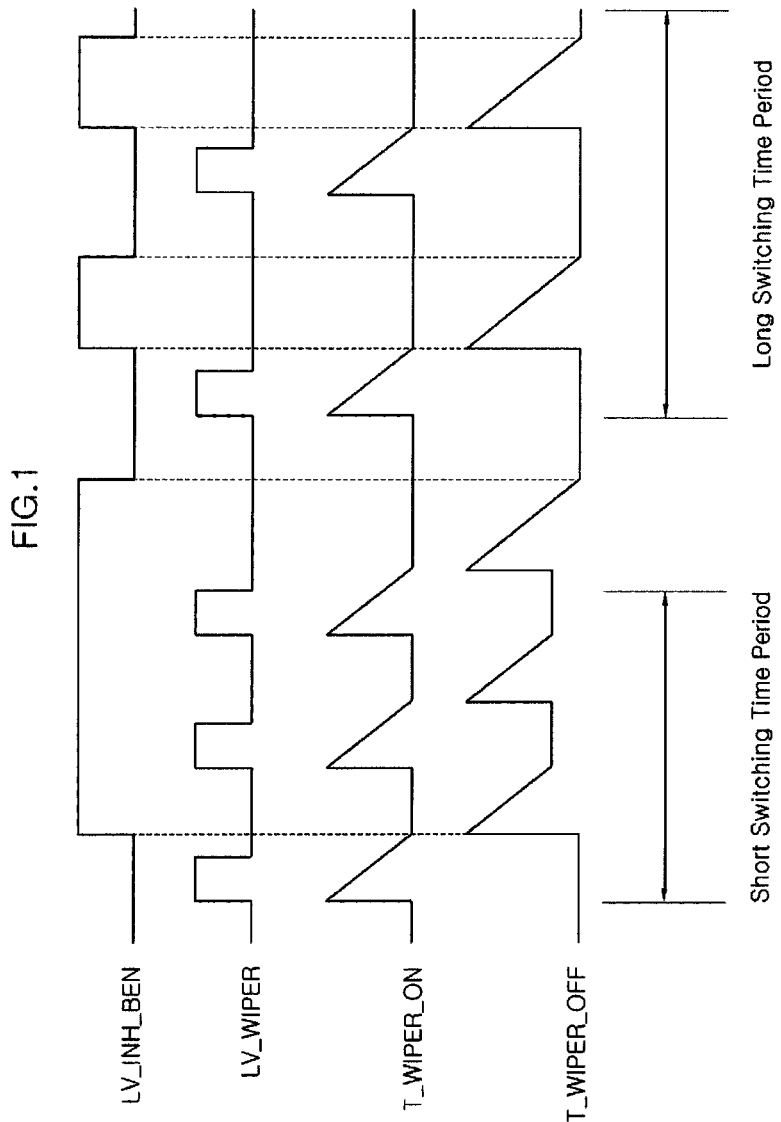
FIG. 1 is a time chart illustrating an electric generation control operation relating to the operation of a wiper of a vehicle generating system of the related art.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
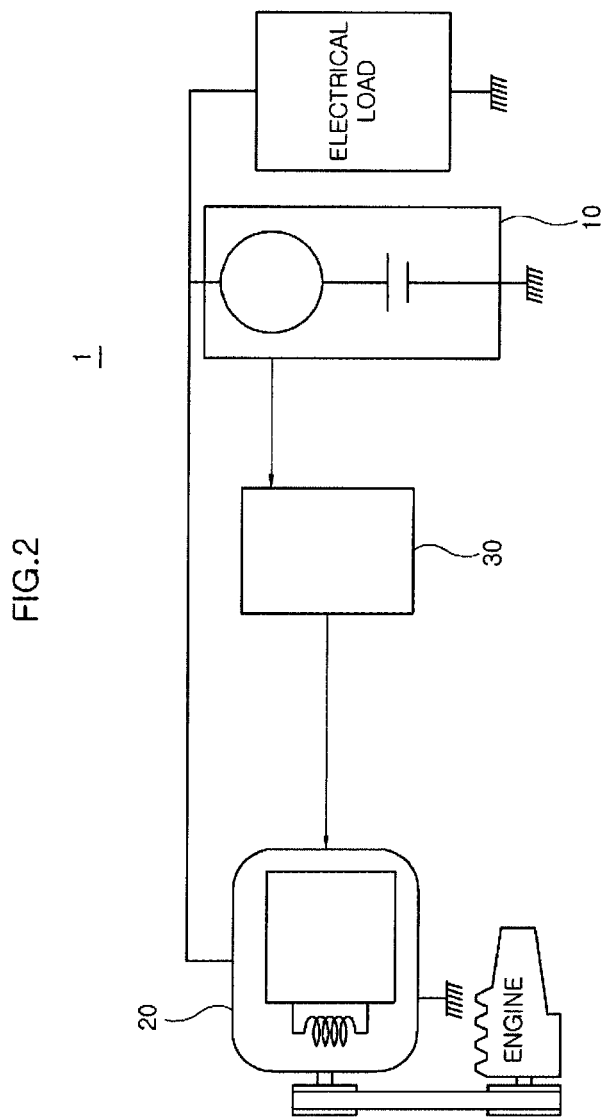
FIG. 2 is a block diagram of an exemplary vehicle generating system according to the present invention.

Referring to FIG. 2, a vehicle generating system 1 according to various embodiments includes a battery 10, an electric generator 20, and an ECU 30. ECU 30 is abbreviation of "Electronic Control Unit", which performs general control according to various embodiments.

Battery 10 is connected with electric generator 20 and various electronic devices of the vehicle. Battery 10 is charged by power from electric generator 20 and provides power to various electronic loads, including a wiper (e.g., a windshield wiper), by control of ECU 30.

Electric generator 20 generates power by using revolution of the engine and the amount of electric generation is adjusted by the control of ECU 30. Electric generator 20 commonly generates power by using revolution of the engine and outputs the generated power in electrostatic voltage by the control of ECU 30.

ECU 30 controls electric generator 20 in accordance with an electric generation control algorithm that is stored in advance, in response to information sensed by a sensor disposed at the engine, the transmission and the battery.

Figure 3:
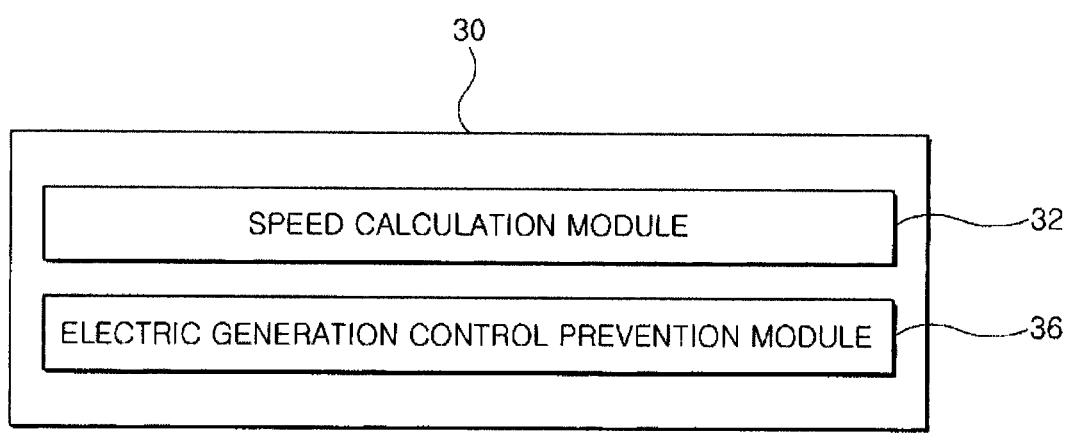
FIG. 3 is a functional block diagram of an exemplary ECU according to the present invention.

Referring to FIG. 3, ECU 30 can be divided into a speed calculation module 32 and an electric generation control prevention module 36.

Speed calculation module 32 calculates the operation speed of the wiper in the electric loads mounted in the vehicle. Speed calculation module 32 can calculate the operation speed of the wiper by monitoring a wiper operation signal LV_WIPER for controlling the operation of a driving motor that drives the wiper.

Figure 4:
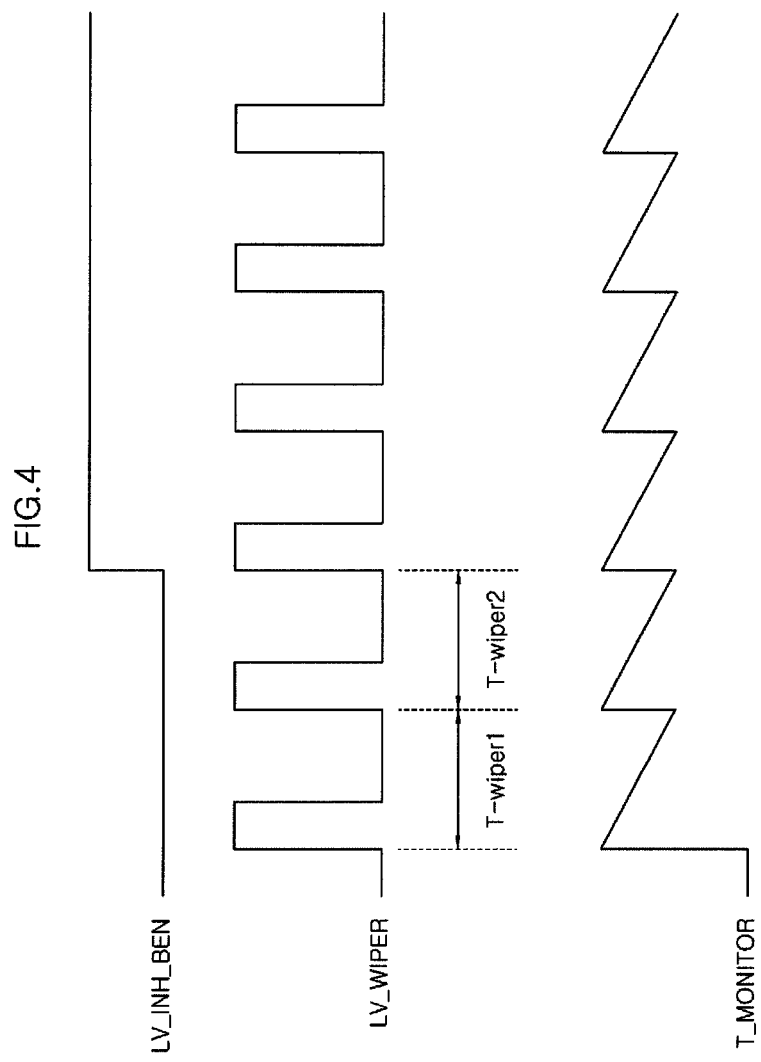
FIG. 4 is a time chart illustrating the calculation of an operation speed index of an exemplary vehicle generating system according to the present invention.

The monitoring is performed by a timer that operates at a rising edge having the waveform of the wiper operation signal LV_WIPER, like a timer monitoring signal (T_MONITOR) shown in FIG. 4. Speed calculation module 32 can calculate the operation speed index corresponding to the operation speed of the wiper by using two connected cycles T-wiper1 and T-wiper2 of the monitored wiper operation signal. Referring to FIG. 4, the operation speed index can be calculated by the average of the two cycles of the wiper operation signal, TIME_WIFER_AVE=(T_Wiper1+T_Wiper2)/2.

Speed calculation module 32 limits monitoring time of the wiper operation signal, when the operation speed is less than a predetermined speed limit. Accordingly, speed calculation module 32 can reduce the time taken to calculate the wiper operation speed when electric generation control prevention is not necessary because the operation speed of the wiper is too low.

Electric generation control prevention module 34 controls electric generator 20 to perform electric generation control prevention when determining that the operation speed calculated by speed calculation module 32 is equal to or more than a predetermined reference speed. On the contrary, electric generation control prevention module 34 does not perform the electric generation control prevention when determining that the operation speed calculated by speed calculation module 32 is less than a predetermined reference speed.

For example, electric generation control prevention module 34 prevents proceeding to electric generation control, when the average TIME_WIFER_AVE of the cycle values of the wiper operation signal, that is, the operation speed index is less than a predetermined threshold determined in accordance with the reference speed. On the contrary, electric generation control prevention module 34 does not perform electric generation control prevention, when the operation speed index is equal to or more than the threshold. The fact that the average TIME_WIFER_AVE of the cycle values of the wiper operation signal is small means that the operation speed of the wiper is high, in which proceeding to the electric generation control is prevented.

As described above, the vehicle generating system according to various embodiments allows the wiper to stably operate in comparison to the related art by performing electric generation control, in accordance with the operation speed of the wiper.

Figure 5:
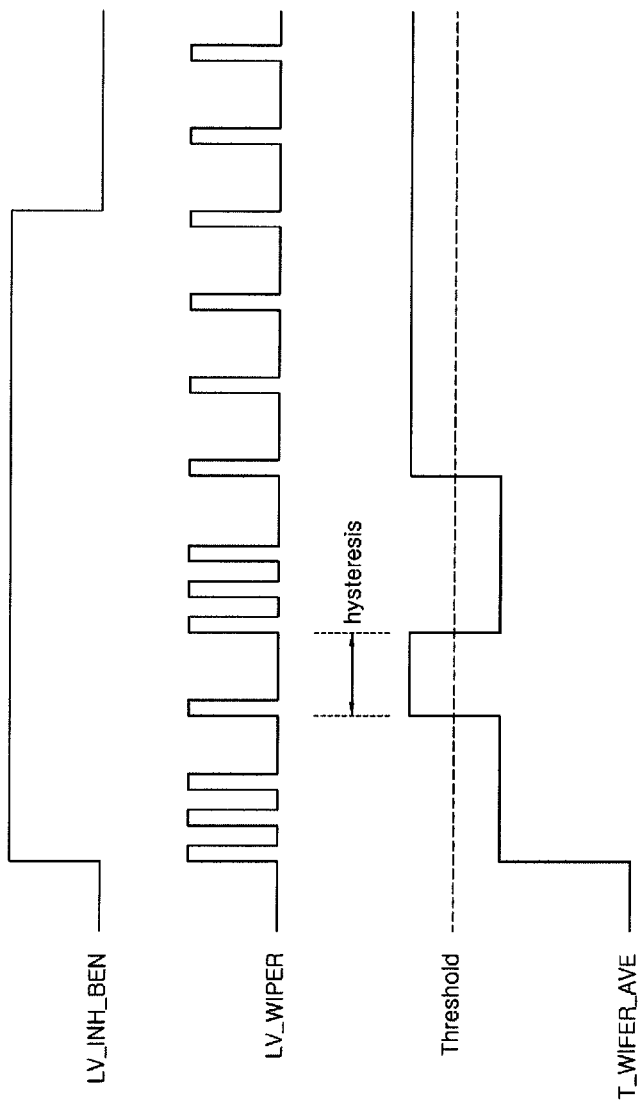
FIG. 5 is a time chart illustrating a hysteresis removal condition of an exemplary vehicle generating system according to the present invention.

Electric generation control prevention module 34 can set a hysteresis condition, as shown in FIG. 5, as a removal condition for removing the electric generation control prevention, that is, a condition for changing the electric generation control prevention signal LV_INH_BEN to '0', when the operation speed changes above a predetermined reference frequency. That is, electric generation control prevention module 34 can minimize the change of the electric generation control prevention signal LV_INH_BEN to '0', when the operation speed is equal to or more than the reference frequency, by the hysteresis condition.

Therefore, it is possible to reduce a side effect, such as deterioration of operability due to oscillation of the electric generation control prevention condition, by compensating the problem that it is difficult to exactly determine the operation time of the wiper, when the operation speed of the wiper frequently changes, using electric generation control prevention module 34.

Figure 6:
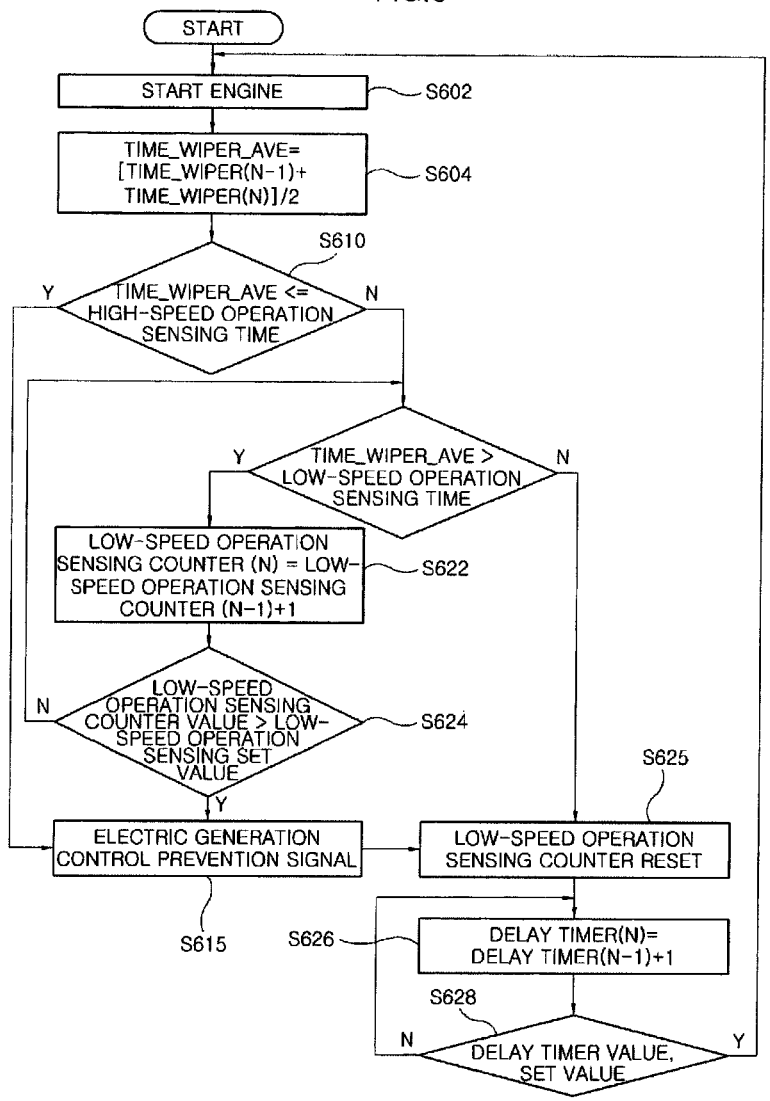
FIG. 6 is a control flowchart of an exemplary vehicle generating system according to the present invention.

Hereinafter, the operation of vehicle generating system 1 according to various embodiments of the present invention is described with reference to FIG. 6. Mainly, the operation of ECU 30 is described herein.

First, when the engine of a vehicle is started, ECU 30 calculates the operation speed of the wiper (S602). For example, ECU 30 calculate the operation speed index TIME_WIPER_AVE corresponding to the operation speed of the wiper by averaging the two connected cycles, by monitoring the operation signal of the wiper.

Next, ECU 30 determines whether the calculated operation speed index of the wiper is equal to or less than a predetermined high-speed operation sensing time, that is, a threshold set in accordance with the reference speed (S610). When the operation speed index is equal to or less than a predetermined high-speed operation sensing time, as the result of the determination, ECU performs control for preventing the electric generation control. ECU 30 proceeds to step S625 described below.

When the operation speed index of the wiper is larger than a predetermined high-speed operation sensing time, as the result of determination in Step S610, ECU 30 determines whether the operation speed index of the wiper is larger than a predetermined low-speed operation sensing time (S620) and proceeds to Step S625 when the operation speed index of the wiper is equal to or less than the predetermined low-speed operation sensing time.

As the result of determination in S620, when the operation speed index of the wiper is larger than the predetermined low-speed operation sensing time, ECU 30 operates a low-speed operation sensing counter S622, determines whether the value of the low-speed operation sensing counter is larger than a predetermined low-speed operation sensing set value S624, and proceeds to step S620 when determining that it is not large.

The predetermined low-speed operation sensing set value is a value corresponding to the speed limit described above in order to limit the monitoring time of the wiper operation signal when the operation speed of the wiper is less than the speed limit.

When it is determined that the value of the low-speed operation sensing counter is larger than the low-speed operation sensing set value in step S624, ECU 30 performs control for preventing electric generation control in step S615 and resets the low-speed operation sensing counter (S625).

Next, ECU 30 operates a delay timer for delaying the proceeding to the electric generation control prevention (S626), keeps the delay timer operating until the value of the delay timer reaches a predetermined delay time set value, and returns to step S602 and performs again the control process when it reaches the delay time set value (S628).

Vehicle generating system 1 according to various embodiments can be wide used for all of vehicles, including hybrid vehicles and electric vehicle, in addition to general vehicles.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A vehicle generating system comprising:
   a battery supplying power to electric loads in a vehicle;
   an electric generator supplying power to the battery and the electric loads;
   a speed calculation module that calculates operation speed of a wiper in the electric loads; and
   an electronic control unit (ECU) including an electric generation control prevention module controlling the electric generator to perform electric generation control prevention when the operation speed calculated by the speed calculation module is compared with a predetermined reference speed and the calculated operation speed is equal to or more than the predetermined reference speed, and controlling the electric generator to remove the electric generation control prevention when the operation speed is less than the predetermined reference speed.

2. The vehicle generating system as defined in claim 1, wherein the speed calculation module calculates an operation speed index corresponding to the operation speed by using the cycle of a wiper operation signal by monitoring the wiper operation signal for controlling the operation of a driving motor that drives the wiper, and the electric generation control prevention module determines that the operation speed is equal to or more than the predetermined reference speed when the operation signal index is less than a threshold set in accordance with the predetermined reference speed, and determines that the operation speed is less than the predetermined reference speed when the cycle of the operation signal is equal to or more than the threshold.

3. The vehicle generating system as defined in claim 2, wherein the operation speed index is calculated by measuring and averaging two connected cycles of the wiper operation signal.

4. The vehicle generating system as defined in claim 2, wherein the speed calculation module limits the monitoring time of the wiper operation signal when the operation speed is less than a predetermined speed limit.

5. The vehicle generating system as defined in claim 1, wherein the electric generation control prevention module sets a hysteresis condition as a removal condition for removing the electric generation control prevention when the operation speed changes above a predetermined frequency.

6. A method of controlling a vehicle generating system including an electric generator supplying power to a battery and electric loads in a vehicle and an electronic control unit (ECU) controlling the electric generator, the method comprising:
   calculating an operation speed index corresponding to the operation speed of a wiper by monitoring an operation signal of the wiper and averaging two connected cycles, in the ECU, when the engine is started; and
   proceeding to electric generation control prevention when the value of the operation speed index is equal to or less than a predetermined high-speed operation sensing time value, in the ECU.

7. The method as defined in claim 6, further comprising proceeding to the electric generation control prevention which operates a low-speed operation sensing counter when the value of the low-speed operation sensing counter reaches a predetermined low-speed operation sensing set value, when the value of the operation speed index is larger than the high-speed operation sensing time value and the value of the operation speed index is larger than a predetermined low-speed operation sensing time value, in the ECU.

* * * * *